United States Patent
Liang et al.

(10) Patent No.: US 7,614,701 B2
(45) Date of Patent: Nov. 10, 2009

(54) SYSTEM AND METHOD FOR REMOTE RELEASE ACTUATING SYSTEM

(75) Inventors: Xinde Liang, Windsor (CA); Xiao Ming Zhao, Windsor (CA); Hans Kogel, Windsor (CA); Renato Colja, Windsor (CA)

(73) Assignee: Schukra of North America, Lakeshore-Tecumseh (CA)

( * ) Notice: Subject to any disclaimer, the term of this patent is extended or adjusted under 35 U.S.C. 154(b) by 719 days.

(21) Appl. No.: 10/945,694

(22) Filed: Sep. 21, 2004

(65) Prior Publication Data

US 2006/0108849 A1 May 25, 2006

(51) Int. Cl.
*B60N 2/02* (2006.01)
*B60N 2/22* (2006.01)

(52) U.S. Cl. .............. 297/378.12; 297/378.1; 297/217.3; 296/65.17

(58) Field of Classification Search .............. 297/217.3, 297/378.1, 378.12; 296/65.17
See application file for complete search history.

(56) References Cited

U.S. PATENT DOCUMENTS

| | | | |
|---|---|---|---|
| 3,188,129 A | 6/1965 | Broch | 292/341.16 |
| 3,657,553 A | 4/1972 | Ballou | 307/10 |
| 3,695,381 A | 10/1972 | Okada et al. | 180/112 |
| 3,817,571 A | 6/1974 | Horvat et al. | |
| 4,466,263 A | 8/1984 | Rathmann | 70/264 |
| 4,702,094 A | 10/1987 | Peterson | 70/241 |
| 4,979,384 A | 12/1990 | Malesko et al. | 70/241 |
| 4,998,049 A | 3/1991 | Chapman | 318/280 |
| 5,348,373 A | 9/1994 | Stiennon | |
| 5,363,718 A | 11/1994 | Ganser et al. | 74/501.5 |
| 5,497,641 A | 3/1996 | Linde et al. | 70/257 |
| 5,697,236 A | 12/1997 | Kleefeldt et al. | 70/257 |
| 5,738,393 A | 4/1998 | Chao | 292/216 |
| 5,765,840 A | 6/1998 | Tame | |
| 5,765,884 A | 6/1998 | Armbruster | 292/216 |
| 5,836,639 A | 11/1998 | Kleefeldt et al. | 296/155 |
| 6,048,002 A | 4/2000 | Ohta et al. | 292/201 |
| 6,050,619 A | 4/2000 | Arabia, Jr. et al. | 292/216 |
| 6,181,024 B1 | 1/2001 | Geil et al. | 307/10.2 |
| 7,118,178 B2 * | 10/2006 | Daniels | 297/378.1 X |
| 7,152,922 B2 * | 12/2006 | Garland | 297/378.1 X |
| 7,320,501 B2 * | 1/2008 | Keyser et al. | 297/378.12 X |
| 2003/0070457 A1 | 4/2003 | Arlt et al. | 70/256 |
| 2004/0026999 A1 | 2/2004 | Hirota et al. | 307/10.1 |

FOREIGN PATENT DOCUMENTS

CA 2451398 A1 2/2003

OTHER PUBLICATIONS

International Search Report for PCT/CA2005/001430.

* cited by examiner

*Primary Examiner*—Anthony D Barfield
(74) *Attorney, Agent, or Firm*—Grant D. Kang; Kang Intellectual Property Law, LLC (57) ABSTRACT

A system and method for remote release actuation is disclosed. The system includes a control mechanism, a switch, a power supply, an actuator assembly, a position sensor, a ground, a cable, and a latch mechanism. The method includes the steps of: providing a remote release actuating system; powering the control mechanism with the power supply; powering the position sensor via the control mechanism; and using the control mechanism to check the electrical connection of the position sensor and powering the actuator assembly to release the cable which releases the latch mechanism into a home position if the position sensor is not connected.

10 Claims, 6 Drawing Sheets

SYSTEM AND METHOD FOR REMOTE RELEASE ACTUATING SYSTEM

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to seats and, more particularly, a system and method for remote release latch actuation of a seat.

2. Related Art

Vehicle seats often include various functional features. Two common features for vehicle seats are a "fold" feature and a "fold-and-tumble" feature. The "fold" feature allows the seat back to fold down over the seat bottom. As an example, many sport utility vehicles have a third row seat that folds to provide additional cargo room or to improve ingress/egress to the vehicle. Additionally, some seats have a "fold-and-tumble" feature that allows the seat to pivot into a collapsed position in the vehicle. The "fold-and-tumble" feature allows the vehicle to have additional cargo room without the necessity of removing the seat(s).

Seats that have a "fold" or "fold-and-tumble" feature generally have one or more latches to lock the seat in a predetermined position. Currently, it is necessary to manually release the latch(es) before the placing the seat in a "fold" or "fold-and-tumble" position. Many users find it inconvenient to manually release the latch. Moreover, those users with inadequate hand strength find the task of releasing the latch(es) to be difficult or tedious.

Four references have been identified as being generally related to the field of remote release actuating systems: U.S. Pat. No. 5,765,884 issued to Armbruster (the "'884 patent"), U.S. Pat. No. 6,050,619 issued to Arabia et al (the "'619 patent"), U.S. Patent Application Publication No. 2004/0026999 issued to Hirota et al (the "'999 application"), and U.S. Pat. No. 5,687,236 issued to Kleefeldt et al (the "'236 patent").

The '884 patent discloses a door latch having a drive element movable between a position corresponding to a closed condition of a vehicle door, a position corresponding to an open condition of the door, and an end reference end position offset from the closed and open positions and engaging a fixed abutment. An electric-drive connected to the mechanism can move the element between the closed and open positions and into the end reference position. A hall-effect sensor detects the current position of the element, and a controller is connected to the sensor to operate the drive.

The '619 patent discloses a cable actuator system for the remote operation of a mechanical device. The '619 patent further discloses the use of a single cable actuator assembly to actuate two operating levers, such as the inside latch and lock operating levers of a door latch. The cable actuator system includes a push-pull cable having a core and a sheath where the core actuates one operating lever and a sheath operates another operating lever.

The '999 application discloses a door lock release device that releases a door latch upon predetermined vehicles states. For example, if the vehicle becomes submerged, then the device will release the door latch. The device includes an actuator for releasing a door lock, a first detection means for detecting an operation of a door handle, a first control circuit for controlling an actuation of the actuator based on the detected door handle operation, a second detection means for detecting a vehicle state, and a second control circuit independent from the first control circuit for controlling the actuation of the actuator based on the detected vehicle state.

The '236 patent discloses a motor-vehicle door latch having a mechanical override for emergency situations. The latch has a pivoting pawl which locks a fork around a latch bolt. Normally, a solenoid is used to pivot the pawl to lock or unlock the latch. The '236 patent discloses the use of Bowden cables attached to the pivoting pawl as an emergency override. For example, a handle located on the inside of the vehicle may be connected to the cable such that a user may simply pull on the handle to unlock and open the door if there is an emergency situation.

There remains a need in the art for a simple, reliable, and effective release actuation system for remotely operating a seat latch mechanism such that a user may Fold or Fold-and-Tumble a vehicle seat.

SUMMARY OF THE INVENTION

It is in view of the above problems that the present invention was developed. The invention is a system and method to provide a remote release function to the latch mechanism of a seat. The system includes an actuator connected to the latch mechanism, a switch, a position sensor, and a control mechanism, such as an electronic control module. A user activates the switch to release the latch mechanism so that the seat may "fold" or "fold-and-tumble." The switch sends a signal to the control mechanism. Thereafter, the control mechanism engages the actuator which releases the latch mechanism. The position sensor monitors the position of the latch mechanism and sends a signal to the control mechanism when the desired function has been achieved. When the desired function has been achieved, the control mechanism allows the actuator to return to a home or start position.

The control mechanism may be an electronic control module or it may be a combination of relays. As an example, the relays may be mounted on a printed circuit board.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
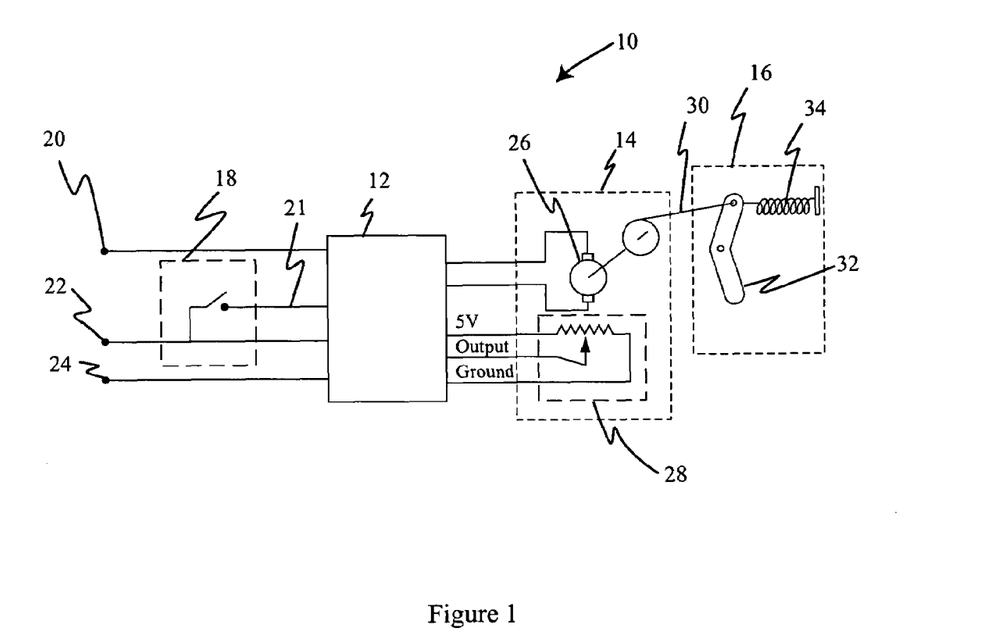
FIG. 1 is a schematic of a remote release actuation system in a first embodiment.

Referring to the accompanying drawings in which like reference numbers indicate like elements, FIG. 1 illustrates a system 10 to provide a remote release function to a latch or latches of a seat. Once the seat is unlatched, the user may "fold" or "fold-and-tumble" the seat. The remote release actuating system 10 includes a control mechanism 12, an actuator assembly 14, a latching mechanism 16, and a switch 18. As an example, the switch 18 may be a toggle switch. In the embodiments depicted in FIGS. 1 and 2, the control mechanism 12 is an electronic control module; however, those skilled in the art would understand that other types of controllers may be used. The actuator assembly 14 includes an actuator 26 and a position sensor 28. The latching mechanism 16 includes a release lever 32 and a return spring 34. The actuator 26 is in operative communication with the lever 32. In the depicted embodiment, a cable 30 connects the actuator 26 to the lever 32.

The remote release actuating system 10 also includes three wires: a switch line 21, a power supply 22, and a ground 24. The power supply 22 provides power for the operation of the system 10. As an example, the three wires 21-24 may be attached to the main electrical system (not shown) of a vehicle, such as a car or truck. In some embodiments, the remote release actuating system includes an enabling line 20.

The enabling line 20 receives a signal from a monitoring device of another subsystem. For example, the enabling line 20 may receive power from the vehicle's electrical system when certain conditions are met, such as when the seat is unoccupied; the vehicle's transmission is in "Park," the vehicle's ignition system is "off," etc. As such, the enabling line 20 can be used to provide a feedback signal to the control module 12 to determine if an object is present on the seat, and thereby prevent activation of the actuator. The enabling line 20 is set to either a high or low voltage signal depending on the configuration of the system (i.e., set to a positive 12 Volts Direct Current by a switch input or pulled to 0 Volts Direct Current by some other vehicle control system). In the depicted embodiments, the control module 12 ignores all requests so long as the enabling line 20 is powered. However, those skilled in the art would understand that the control module 12 could equally ignore all requests so long as the enabling line 20 is not powered. When the subsystem is in operation, the control module 12 must be in waiting mode so that no power is delivered to the actuator 26. Upon completion of the subsystem's operation, power is removed from the enabling line 20 and the control module 12 may operate.

As soon as the control module 12 is enabled, the control module 12 checks: 1) whether the position sensor 28, such as a potentiometer, is connected, and 2) whether the lever 32 is in a home position. If the potentiometer 28 is not connected, the control module 12 powers the actuator 26 and drives the lever 32 towards its home position. The home position of the lever 32 is the natural position of the lever 32 before any operation. In this position, the cable 30 is full out and the output of the potentiometer 28 is larger than xV (where x is determined through experimentation). The return spring 34 biases the lever 32 toward the home position. The control module 12 stays ready and waits for the signal from the switch 18. If the lever 32 is not in the home position, the control module 12 powers the actuator 26 to bring the lever 32 back to the home position. Upon reaching the home position, the control module 12 stays ready and waits for the signal from the switch 18.

The switch 18 starts the operation when it is pushed and held for more than 100 milliseconds. After the switch 18 is held for more than 100 milliseconds, a request for operation is then given to the control module 12 via the switch line 21. After a request for operation is given, the control module 12 checks the voltage of the enable line 20 to determine whether it must wait for the subsystem to complete its operation. During the waiting period, any signal coming from the switch 18 is ignored.

When the subsystem completes its operation and power is removed from the enable line 20, the control module 12 powers the actuator 26 from the power supplied by the vehicle. In the depicted embodiments, the actuator is powered with 12.5 Volts (Direct Current) with a defined polarity. As an example, the actuator 26 may be a motor and pulley arrangement. In some embodiments, a multiplication system, such as a combination of gears or pulleys, may be intermediate the motor and the pulley. The actuator 26 pulls or releases the cable 30, which then pulls or releases the lever 32. The control module 12 will remove the power to the actuator 26 when the current of the motor exceeds a predetermined safe operating limit, for example 3 Amperes for one second. The position of the cable 30 and lever 32 is monitored by the position sensor 28, which in the depicted embodiment is a potentiometer. The potentiometer 28 is powered by the control module 12 with 5 Volts (Direct Current).

The control module 12 powers the actuator 26 until one of the following conditions are met: 1) the output voltage of the potentiometer 28 reaches yV (where y is determined experimentally), or the actuator 26 draws more than a threshold current established for the system. If the output voltages reaches yV, the control module 12 removes the power to the actuator 26. After a dwell time of 0.5 seconds, which allows the actuator 26 to stop, the control module 12 will power the actuator 26 with a reversed polarity to bring the cable 30 and the lever 32 back to the home position. When the home position is reached (i.e., potentiometer output=xV), the control module 12 resumes its waiting mode.

If the actuator 26 draws more than a threshold current established for the system, the control module 12 then removes the power to the actuator 26 and powers the actuator 26 with reversed polarity until the actuator 26 draws more than the threshold current. The control module 12 then resumes its waiting mode.

Figure 2:
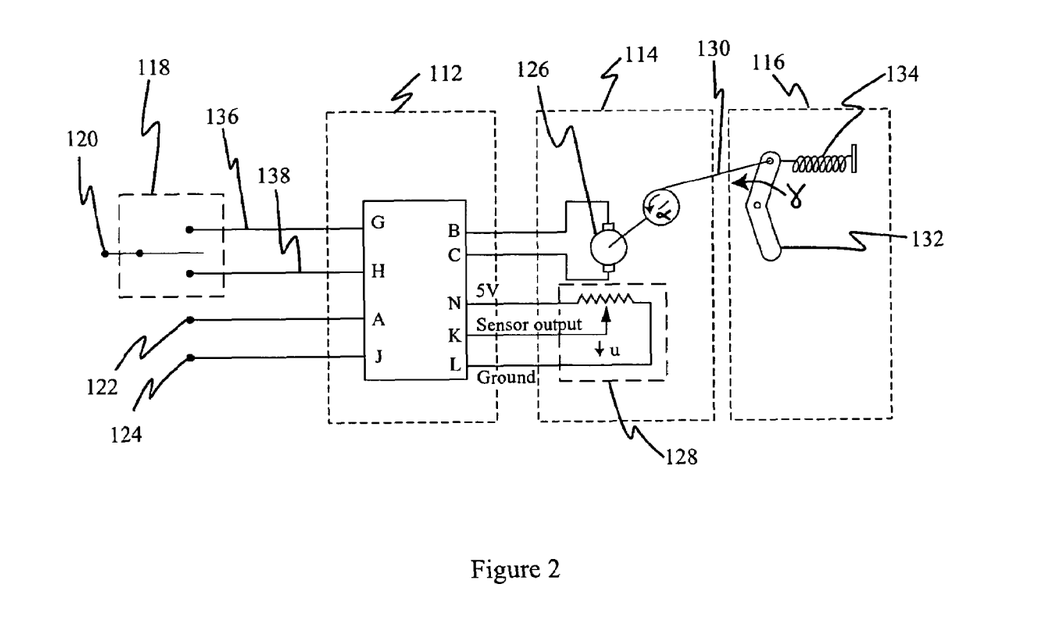
FIG. 2 is a schematic of the remote release actuation system in a second embodiment.

FIG. 2 illustrates a second embodiment of the remote release latch actuation system 100. The remote release actuating system 100 includes a control module 112, an actuator assembly 114, a latch mechanism 116, and a switch 118. As an example only, the switch 118 may be a double-throw toggle switch. The actuator assembly 114 includes an actuator 126 and a position sensor 128. The latching mechanism 116 includes a lever 132 and a return spring 134. The actuator 126 is in operative communication with the lever 132. In the depicted embodiment, a cable 130 connects the actuator 126 to the lever 132.

The remote release actuating system 100 also includes four wires: a G wire 136, an H wire 138, a power supply wire 122, and a ground wire 124. In some embodiments, the remote release actuating system 100 further includes an enabling wire 120 which can provide an additional input signal. For manufacturing purposes it may be desirable to produce all devices with an enabling wire. If all devices have an enabling wire but some customers do not desire its use, the enabling wire may simply be connected to the power supply wire 122 such that the control module 112 is continuously enabled.

The remote release actuating system 100 includes the function of monitoring the position of the cable 130 and/or the lever 132. The position sensor 128, such as a potentiometer, is located inside the actuator assembly 114 and indirectly senses the position of the cable 130 and/or the lever 132. In the depicted embodiment, the voltage of the position sensor 128 decreases as the actuator 126 pulls the lever 132 and increases as the actuator 126 releases the lever 132. However, those skilled in the art would understand that the voltage from the position sensor 128 could also increase as the actuator 126 pulls the lever 132. The natural position of the lever 132 with cable 130 full out is defined as its home position (identified through sensor voltage).

Alternatively, the position sensor 128 may be a HAL Effect sensor. The HAL Effect sensor replaces the potentiometer described above. Rather than controlling the device by the voltage signal from the potentiometer, the number of pulses generated by the HAL Effect sensor are counted and used by the control module 112 to determine the position of the lever 132 and/or the actuator 126.

Figure 3:
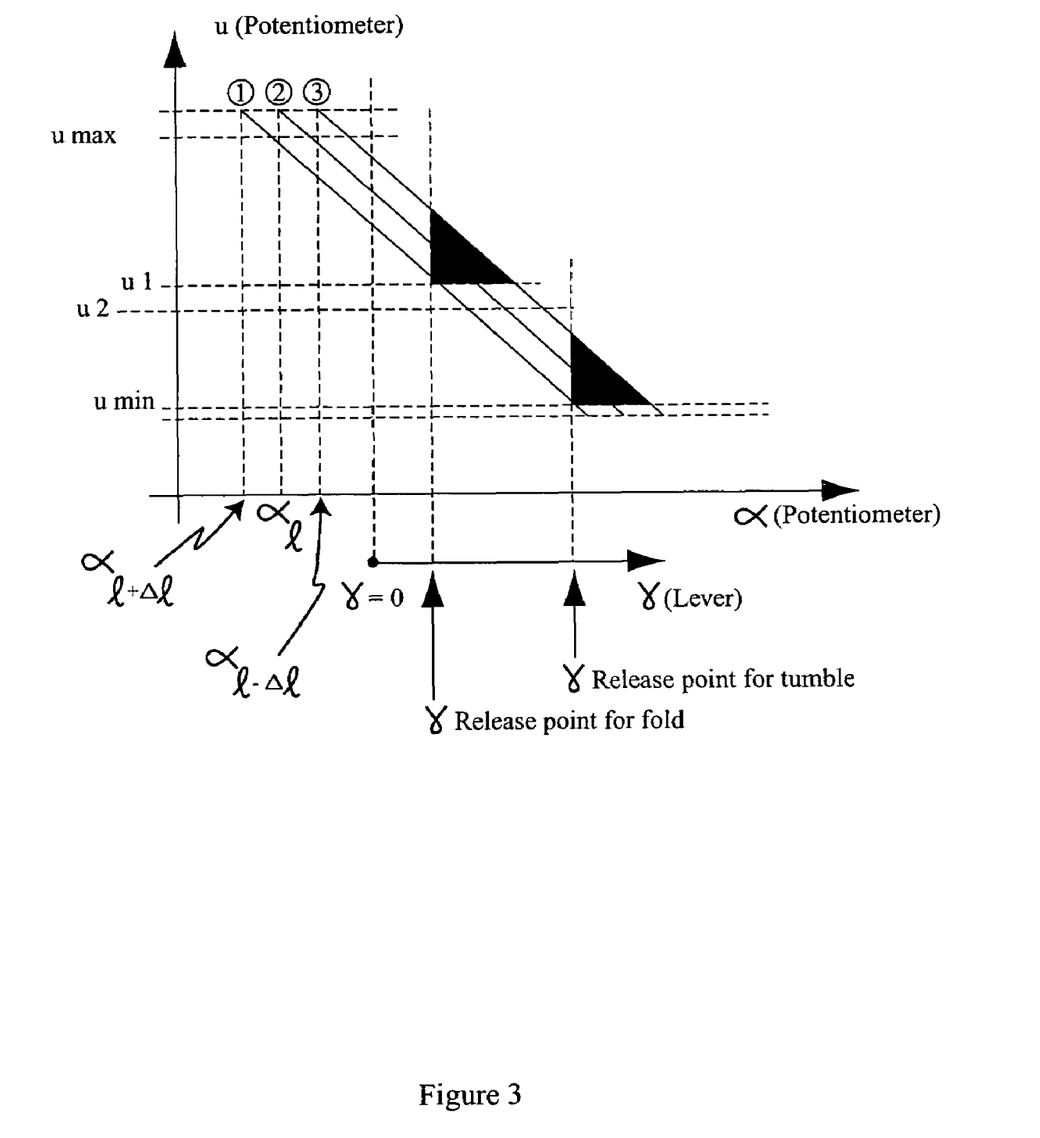
FIG. 3 is a graphic illustration of an angular position of a lever versus position sensor voltage.

FIG. 3 illustrates the angular position y of the lever 132 in relation to the voltage U of the position sensor 128. The lever 132 is in its home position when U>Umax−ΔU or when U>Umax+ΔU. When the output voltage of the position sensor 128 gets below U1, this indicates that the Fold operation of the seat back has already been triggered. The tumble operation of the whole seat can be triggered when the output of the position sensor 128 goes below U2 and has already been triggered when U=Umax.

The power to the control module 112 is made available via the power supply line 122, for example, when the ignition is "on." When the vehicle is in a predetermined position, for example when the transmission is in "Park," power is made available to the switch 118 via the enable line 120. The control module 112 has a "G" pin and an "H" pin. When the switch 118 is powered to the "G" pin for more than 100 milliseconds, a request is sent to the control module 112 to fold the seat back and tumble the whole seat. Specifically, when the switch 118 is toggled to the "G" pin for more than 100 milliseconds, the control module 112 will power the actuator 126 to pull the lever 132 until the output voltage of the position sensor 128 goes down to Umin. The control module 112 then removes the power to the actuator 126. After a dwell time of 0.25 second to allow the actuator 126 to come to a full stop, the control module 112 will power the actuator 126 with reversed polarity to allow the cable 130 and/or the lever 132 to go back to the home position.

When the switch 118 provides a signal to the "H" pin for more than 100 milliseconds, the request for folding the seat back is given to the control module 112. Specifically, when the switch 118 provides a signal to the "H" pin for more than 100 milliseconds, the control module 112 will power the actuator 126 to pull the lever 132 until the output voltage of the position sensor 128 gets below U1 but is still above U2. The control module 112 then removes the power to the actuator 126. After a dwell time of 0.25 second to allow the actuator 126 to come to a full stop, the control module 112 will power the actuator 126 with reversed polarity to allow the cable 130 and/or the lever 134 to go back to the home position.

The control module 112 will stop the actuator 126 and ensure the lever 132 returns to its home position whenever one of the following conditions is met: 1) the difference between two sequential position sensor readings (at a sampling rate of every 100 milliseconds) is less than XX Volts (where XX is determined experimentally), 2) when the actuator 126 pulls the lever 132 (this protects against motor stall in the pull direction), or 3) when the motor is powered for more than 5 seconds.

The cable 130 must be released to allow the lever 132 to go back to the home position. Whenever the home position is reached, the control module 112 will stay ready waiting for further instructions. If the control module 112 receives no signal from the switch 118 for 15 seconds, it will go into sleep mode to save power. As an example only, the current draw during sleep mode of the control module 112 may be in the range of 0-100 milliamperes.

If further request is applied on either the "H" pin or the "G" pin during the normal Fold or Fold-and-Tumble operation, the control module 112 may be programmed to: 1) ignore any further requests, 2) switch over function, or 3) switch over and stop function.

If the control module 112 is programmed to switch over function, the control module 112 is programmed to react differently depending on the operation it is in. During normal Fold operation, the control module 112 ignores further requests for Fold operation. However, it will accept requests for Fold-and-Tumble operation and switch over right away. If it requires the actuator 126 to change direction, the actuator 126 has to come to a full stop before the power with reversed polarity can be applied. The control module 112 ignores any further requests until the designated operation is complete.

During normal Fold-and-Tumble operation, the control module 112 ignores further request for Fold-and-Tumble operation. However, it will accept request for Fold operation if the initial Tumble operation has not been triggered when the request is received (e.g., the actuator 126 is still pulling the lever 132). Then the control module 112 has to ensure that the Fold operation of the seat back is complete and the lever 132 then returns to the home position. The control module 112 ignores any further requests until the designated operation is complete.

If the control module 112 is programmed to the switch over and stop function, the control module is also programmed to react differently depending on the operation it is in. During any Fold operation, a further request for Fold will not be ignored. The control module 112 will stop the initial Fold operation and ensure the lever 132 returns to the home position. The control module 112 ignores any further requests before the home position is reached. During any Fold-and-Tumble operation, a further request for Fold-and-Tumble operation will not be ignored. The control module 112 will stop the initial Fold-and-Tumble operation and ensure the lever 132 returns to the home position. The control module 112 ignores any further requests before the home position is reached.

Figure 4:
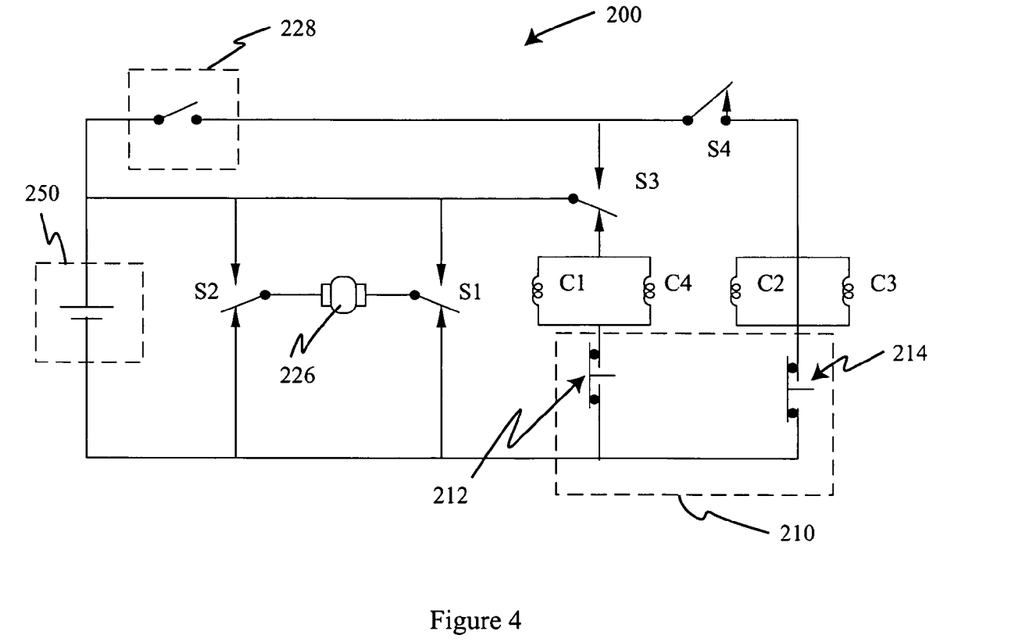
FIG. 4 is a schematic of a control module in a first embodiment.

FIG. 4 illustrates schematically a first embodiment of a control mechanism 200 for controlling the remote release latch actuating system 10, 100. The control mechanism 200 includes a first relay 216, a second relay 218, a third relay 220, and a fourth relay 222. In the depicted embodiment, the relays 216-222 are mounted on a printed circuit board. The first relay includes a first coil C1 and a first switch contact S1. The second relay 218 includes a second coil C2 and a second switch contact S2. The third relay 220 includes a third coil C3 and a third switch contact S3. The fourth relay 222 includes a fourth coil C4 and a fourth switch contact S4. The control mechanism 200 further includes an actuator motor 226, a switch 228, a home position sensor 212, and an end of travel sensor 214. In the depicted embodiment, the home position sensor 212 and the end of travel sensor 214 are provided as one unit, namely a position sensor 210; however, those skilled in the art would understand that separate sensors may be used. The position sensor 210 sometimes is referred to as a "copper trace." Alternatively, the home position sensor 212 and the end of travel sensor 214 may be mounted within a housing of the actuator assembly.

In the embodiment depicted in FIG. 4, the switch contacts S1-S4 of each relay are in a none-powered position. In this position, each terminal of the motor 226 is connected to a negative terminal (not shown) of a battery 250. As such, the motor input is shorted out, and the motor 226 receives no power. As soon as one of the first or second coils C1, C2 receives power, the motor 226 will rotate. If the first coil C1 of the first relay 216 receives power, the switch contact S1 is closed to a positive terminal (not shown) of the battery 250, and the motor 226 receives power. The motor 226 starts to release a cable allowing the cable to go back to its home position. On the other hand, if the second coil C2 of the second relay 218 receives power, the second switch contact S2 is closed to the positive terminal of the battery 250, the motor 226 will receive power with reversed polarity and the motor 226 starts to pull the cable for Fold operation. If both first and second coils C1, C2 receive power at the same time, the first and second switch contacts S1, S2 will be connected to the positive terminal of the battery 250. In this situation, the motor input is shorted out and receives no power.

The operation of the control mechanism 200 depends on whether the cable is in its home position. When the cable is away from its home position, the switch contacts of the home position sensor 212 remain closed and the first coil C1 receives power from the battery 250 (current path: battery, switch contact S3, coil C1, home position sensor, and back to battery). The first switch contact S1 is closed to the positive terminal of the battery 250 and the motor 226 drives the actuator allowing the cable to return to the home position. Because the fourth coil C4 is in parallel to the first coil C1, it is powered at the same time. When the fourth switch contact S4 becomes open, the possible request for Fold from the switch 228 cannot reach the second and third coils C2, C3. This ensures that the control mechanism 200 receives no requests during the process of going back to the home position. As soon as the home position is reached, the switch contacts of the home position sensor 212 become open. The first coil C1 then losses its power, the first switch contacts S1 jump back from one side of the battery 250 to the other, and the motor 226 stops its operation. The fourth coil C4 losses its power at the same time, and the fourth switch contact S4 is closed. The control mechanism 200 is then ready to receive a request for Fold operation.

The control mechanism 200 takes no action if the cable is already in its home position (i.e., the switch of Home position sensor is open) when the power is on. This guarantees that the actuator is always in its home position (at least) shortly after the system is powered. In other words, the operation can begin only when the cable is in its home position and the switch of home position sensor is open. When no current flows through any of the coils C1-C4, the control mechanism 200 is ready to receive a request.

When the switch 228 is closed, the current will go through the path of battery 250, the switch 228, the fourth switch contact S4, the second and third coils C2, C3, the end of travel sensor 214 (closed), and back to the battery 250. Because the third coil C3 is powered, the third switch contact S3 is closed to the line that goes to the second and third coils C2, C3. This allows the second and third coils C2, C3 to get power via different paths (Battery, switch contact S3, switch contact S4, coils C2/C3, end of travel sensor, and back to battery) after the switch 228 is released.

As the second coil C2 is powered, the second switch contact S2 is closed to the positive terminal of the battery 250, the motor 226 receives power and the actuator starts to pull the cable for Fold operation. Upon reaching the end of the designated travel, the switch contacts of the end of travel sensor 214 become open, and the second and third coils C2, C3 lose their power. Both second and third switch contacts S2, S3 jump back to their natural positions. The motor 226 stops and the second and third coils C2, C3 cannot receive power any more even though the switch contacts of the end of travel sensor 214 become closed later on.

Because the third switch contact S3 jumps back to its natural position, the first coil C1 receives power. Knowing that the cable is away from home position (sensed by the switch of home position sensor that is closed now), the back-to-home operation is trigger, which has been described above.

Upon reaching the home position, the first coil C1 losses its power, and the motor 226 stops its operation. The fourth coil C4 losses its power too and the fourth switch contact S4 is closed. The control mechanism 200 is ready for the next operation.

Figure 5:
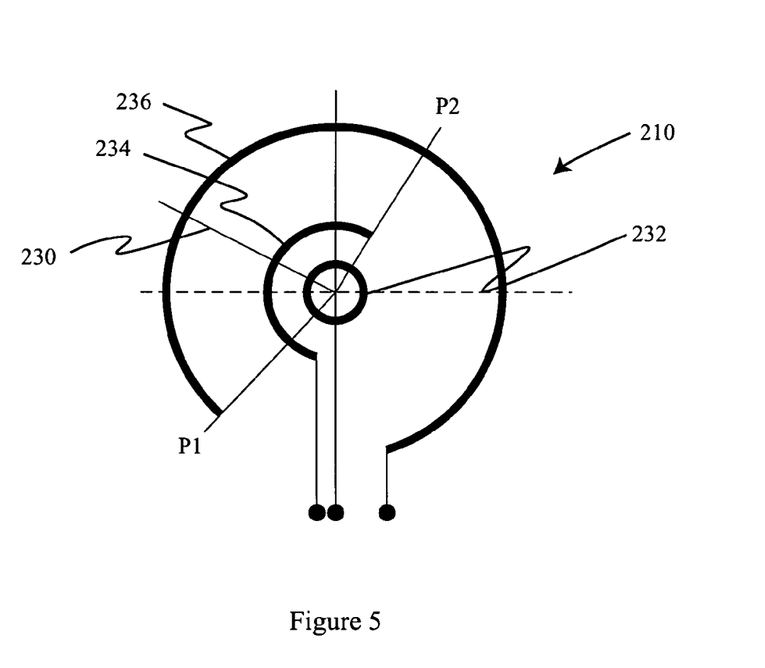
FIG. 5 is a schematic of a position sensor in a first embodiment.

FIG. 5 illustrates the position sensor 210 with P1 as the home position and P2 as the end of travel position. The position sensor 210 includes a center trace 232, an inner trace 234, and outer trace 236, and a wiper 230. The home position sensor 212 utilizes the center trace 232 and the outer trace 236. At P1, the wiper 230 only contacts the center trace 232 and does not contact the outer trace 236. Therefore, at P1, switch contacts (not shown) of the home position sensor 212 are "open." However, for any position between P1 and P2, the wiper 230 contacts both the center trace 232 and the outer trace 236. Therefore, for any position between P1 and P2, the switch contacts of the home position sensor 212 are "closed."

The end of travel sensor 214 utilizes the inner trace 234 and the outer trace 236. At P2, the wiper 230 only contacts the outer trace 236 and does not contact the inner trace 234. Therefore, at P2, switch contacts (not shown) of the end of travel sensor 214 are "open." However, for any position between P1 and P2, the wiper 230 contacts both the inner trace 234 and the outer trace 236. Therefore, for any position between P1 and P2, the switch contacts of the end of travel sensor 214 are "closed."

Figure 6:
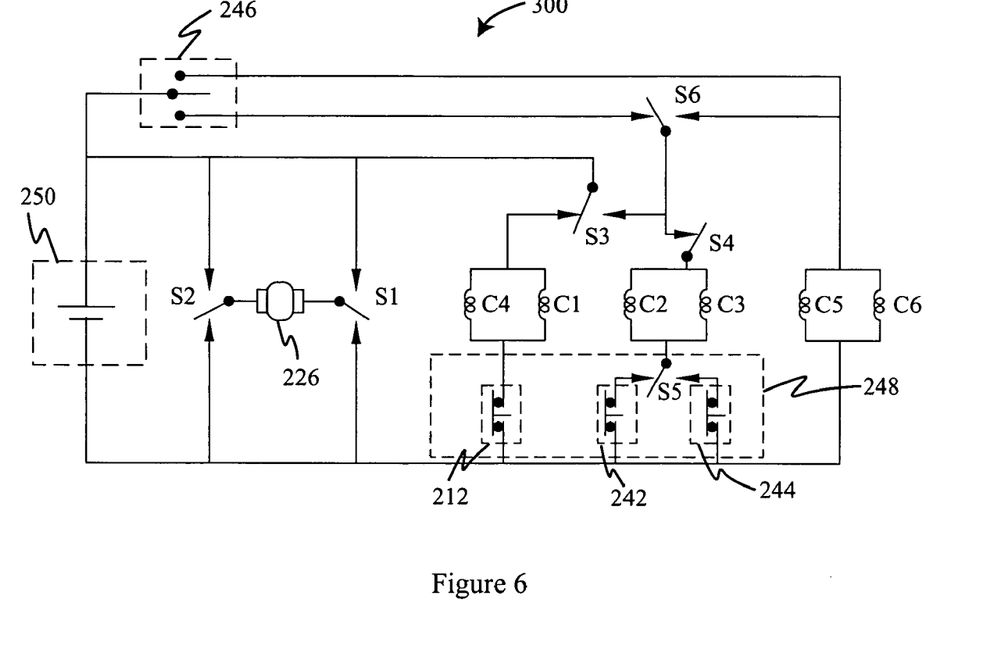
FIG. 6 is a schematic of the control module in a second embodiment.

FIG. 6 illustrates a second embodiment of the control mechanism, generally indicated by reference numeral 300. This second embodiment provides for seat systems that require both a Fold and a Fold-and-Tumble operation. The second embodiment is nearly identical to the first embodiment except for the addition of a fifth relay 238, a sixth relay 240, a first end of travel sensor 242, and a second end of travel sensor 244. The fifth relay 238 includes a fifth coil C5 and a fifth switch contact S5. The sixth relay 240 includes a sixth coil C6 and a sixth switch contact S6. Additionally, the single-throw switch 228 has been replaced with a double-throw switch 246. In the depicted embodiment, the home position sensor 212, the first end of travel sensor 242, and the second end of travel sensor 244 are provided as one unit, a position sensor 248; however, those skilled in the art would understand that separate sensors may be used.

The switch 246 has a first position T1 and a second position T2. When the switch 246 is placed in the first position T1, the control mechanism 300 functions the same as the first embodiment. However, when the switch 246 is placed in the second position T2, the fifth and sixth relays 238, 240 are powered, thereby allowing for a fold-and-tumble function.

When the fifth and sixth relays 238, 240 are powered, the fifth and sixth switch contacts S5, S6 are closed to the right hand side. In the depicted embodiment, the fifth switch contact S5 is closed to the left hand side, and the first end of travel sensor 242 is utilized instead of the second end of travel sensor 244. However, when the fifth switch contact S5 is closed to the right hand side, the second end of travel sensor 244 is utilized instead of the first end of travel sensor 242. The sixth switch contact S6 is connected to the signal line for Tumble, instead of the one for Fold.

When the fifth relay 238 and the sixth relay 240 are not powered, the control mechanism 300 works in the same way as for the Fold operation described corresponding to the control module 200.

Figure 7:
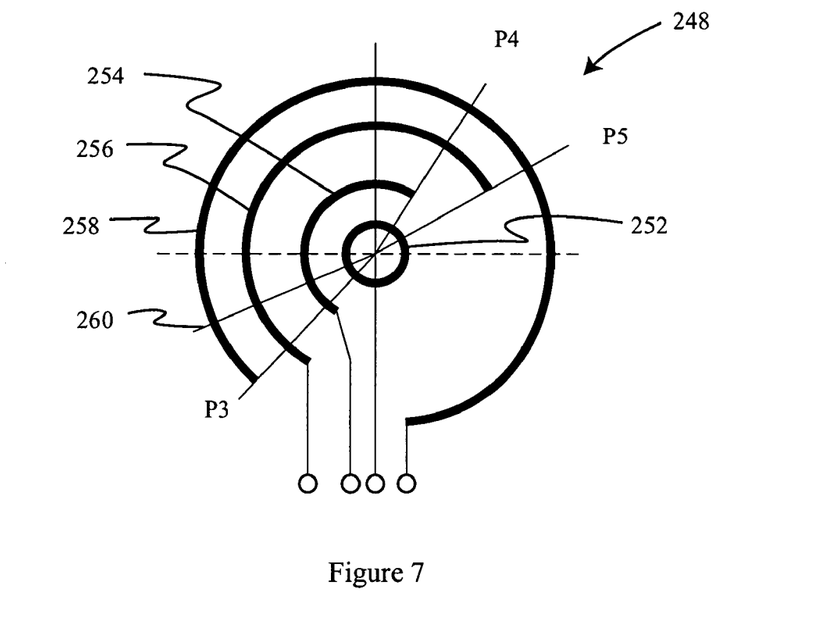
FIG. 7 is a schematic of the position sensor in a second embodiment.

FIG. 7 illustrates in greater detail the position sensor 248. The position sensor 248 has a home position P3, a first end of travel position P4, and a second end of travel position P5. The copper trace 248 includes a center trace 252, an inner trace 254, a middle trace 256, an outer trace 258, and a wiper 260. The home position sensor 212 utilizes the center trace 252 and the outer trace 258. At P3, the wiper 260 only contacts the center trace 252 and does not contact the outer trace 258. Therefore, at P3, switch contacts (not shown) of the home position sensor 212 are "open." However, for any position between P3 and P5, the wiper 260 contacts both the center trace 252 and the outer trace 258. Therefore, for any position between P3 and P5, the switch contacts of the home position sensor 212 are "closed."

The first end of travel sensor 242 utilizes the inner trace 254 and the outer trace 258. At P4, the wiper 260 only contacts the outer trace 258 and does not contact the inner trace 254. Therefore, at P4, switch contacts (not shown) of the first end of travel sensor 242 are "open." However, for any position between P3 and P4, the wiper 260 contacts both the inner trace 254 and the outer trace 258. Therefore, for any position between P3 and P4, the switch contacts of the first end of travel sensor 242 are "closed."

The second end of travel sensor 244 utilizes the middle trace 256 and the outer trace 258. At P5, the wiper 260 only contacts the outer trace 258 and does not contact the middle trace 256. Therefore, at P5, switch contacts (not shown) of the second end of travel sensor 244 are "open." However, for any position between P3 and P5, the wiper 260 contacts both the middle trace 256 and the outer trace 258. Therefore, for any position between P3 and P5, the switch contacts of the second end of travel sensor 244 are "closed."

Figure 8:
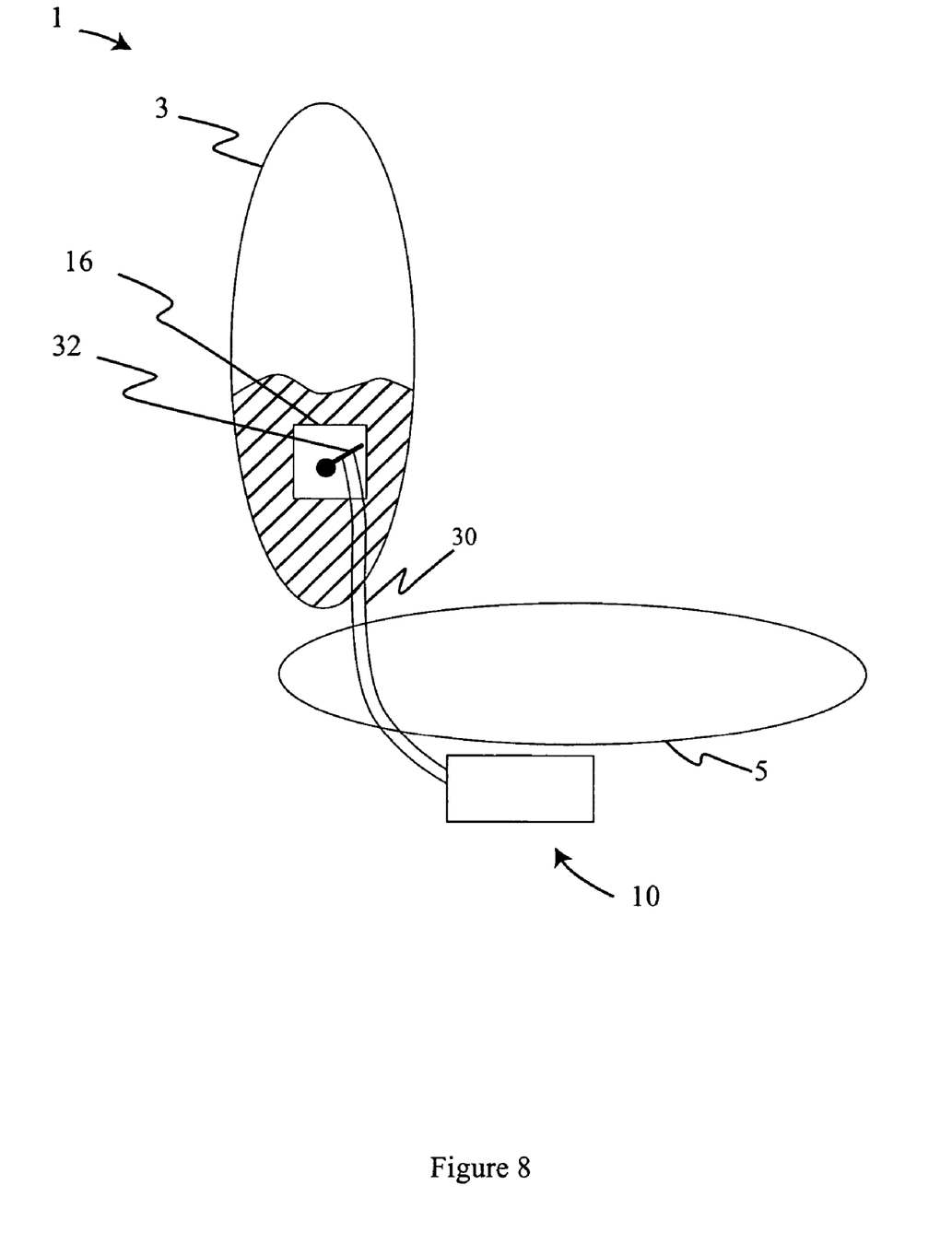
FIG. 8 is a side view of a seat.

FIG. 8 illustrates a seat 1 having a seat back 3 and a seat bottom 5. In operation, a user operates the remote release actuation system 10 to "fold" the seat back 3. First, the user engages a switch (not shown), such as a double-throw toggle switch. The user pushes the switch in a first direction, indicating that the user would like to "fold" the seat 1. The switch sends a signal to the control mechanism (not shown). The control mechanism first ensures that a latch mechanism 16 is in its home position by checking the signal from a position sensor (not shown). If it is not, then the control mechanism returns the latch mechanism 16 to its home position. If initially the latch mechanism 16 is in the home position, the control mechanism sends a signal to an actuator (not shown). Thereafter, the actuator moves the latch mechanism 16 from the home position to a second position in which the latch is released. In the depicted embodiment, the actuator moves a cable 30 which acts on a lever 32. Once the latch mechanism 16 is released, a spring force (not shown) acts on the seat to fold the seat back 3 over the seat bottom 5. Finally, the control mechanism sends another signal to the actuator to return the latch mechanism 16 to the home position.

Alternatively, the user pushes the switch in a second direction, indicating that the user would like to fold-and-tumble the seat 1. The switch sends a signal to the control mechanism. The control mechanism first ensures that the latch mechanism is in its home position by checking the signal from the position sensor. If it is not in the home position, then the control mechanism returns the latch mechanism 16 to its home position. If initially the latch mechanism 16 is in the home position, the control mechanism sends a signal to the actuator. Thereafter, the actuator moves the latch mechanism 16 from the home position to a second position in which the latch is released. Once the latch is released, a spring force (not shown) acts on the seat back 3 and the seat bottom 5 to fold-and-tumble the seat. Finally, the control mechanism sends another signal to the actuator to return the latch mechanism to the home position.

Figure 9:
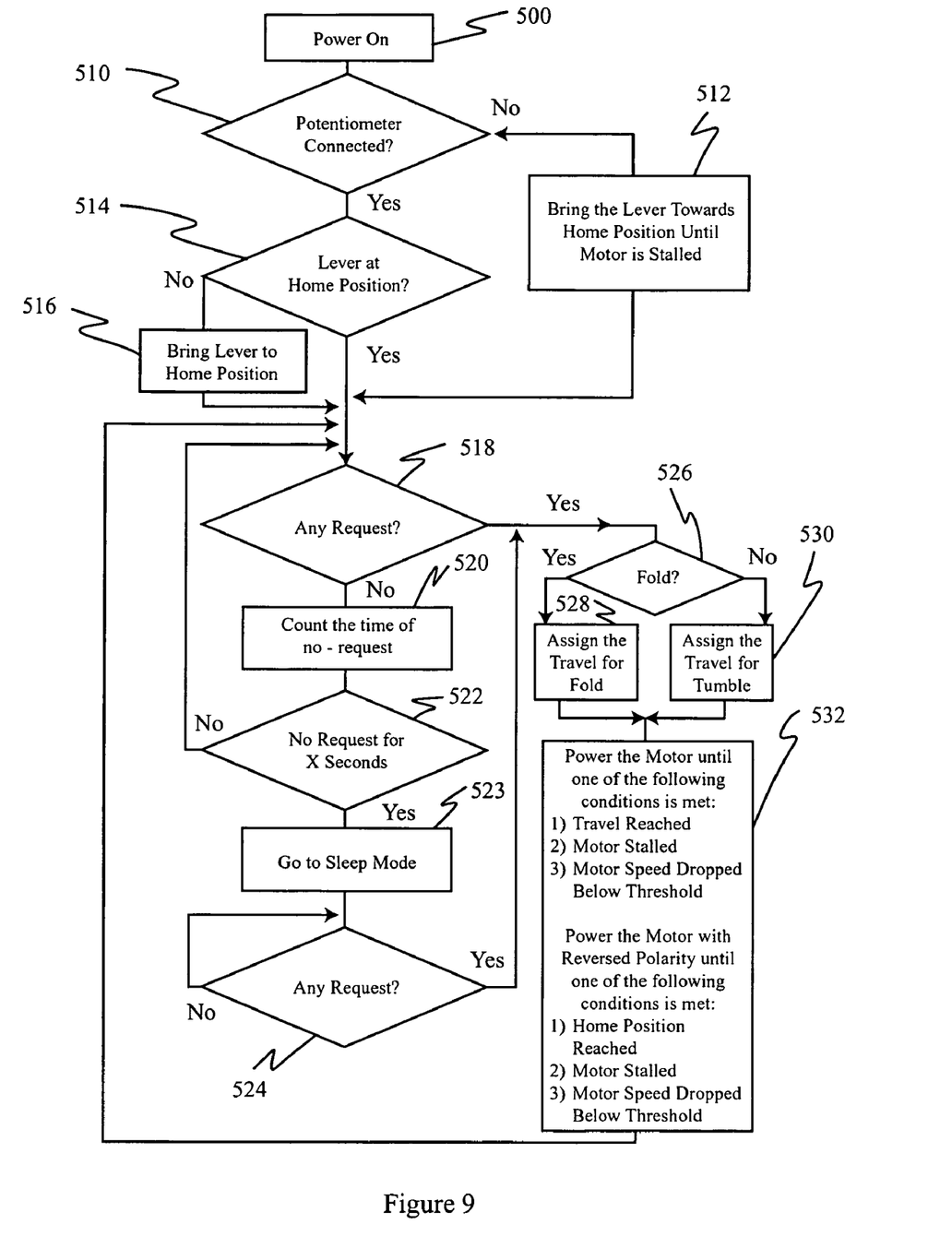
FIG. 9 is a flowchart illustrating the operation of the remote release actuation system.

FIG. 9 is a flowchart of an electronic control module, such as the electronic control module 12, 112. In a first step 500, power is provided to the control module. In a second step 510, the control module inquires whether the position sensor is connected. If the position sensor is not connected, then control module operates the actuator until the latch mechanism is in the home position in step 512, which generally occurs when the actuator stalls. In a third step 514, the control module inquires whether the latch mechanism is in the home position. If the latch mechanism is not in the home position, then the control module operates the actuator to place the latch mechanism in the home position in step 516. In a fourth step 518, the control module inquires for a request. If there has not been a request, the control module activates a counter in step 520. In step 522, the control module inquires whether a request has been made within a predetermined period of time. If no request has been made within the predefined period of time, the control module enters sleep mode in step 523. Otherwise, the control module loops back to step 518. In step 524, a request may remove the control module from sleep mode.

If a request has been made, the control module inquires whether the request is for fold or fold-and-tumble in step 526. In some embodiments, this decision may be eliminated if the seat can only fold. If a fold has been requested, then the control module assigns the actuator a sufficient amount of travel such that the seat back is folded in step 528. However, if a fold-and-tumble is requested, then the control module assigns the actuator a sufficient amount of travel such that the seat folds-and-tumbles in step 530. The control module continuously powers the actuator until one of the following conditions is met: 1) the end of travel is reached; 2) the actuator stalls; or 3) the actuator speed drops below a certain threshold. Once one of these conditions is met, the control module powers the actuator with reverse polarity in step 532. The control module continuously powers the actuator until one of the following conditions is met: 1) the home position is reached; 2) the actuator stalls; or 3) the actuator speed drops below a certain threshold. Thereafter, the control module loops back to step 518

A method for remote release of a seat latch mechanism includes the steps of providing a remote release actuating system comprising a switch, a control mechanism, an actuator, and a position sensor, the actuator being in operative communication with the latch mechanism; engaging the switch; receiving a signal from the position sensor; powering the actuator via the control mechanism; moving the latch mechanism from a home position to a second position; and returning the latch mechanism to the home position.

In the depicted embodiments, the latch mechanism is moved by moving a cable. The cable is moved via the actuator. The cable is moved in a first direction by powering the actuator in a first direction. The cable is moved in the opposite direction by powering the actuator with a reversed polarity.

The method may include several optional steps. For example, the control mechanism may inquire whether the latch mechanism is in the home position. A further optional step may include sensing an amount of current delivered to the actuator. Some embodiments may include an enabling line, and an additional step may include power the enabling line. In yet another example, the control mechanism may monitor the position of the latch mechanism. Finally, the step of powering the control mechanism may include the step of powering at least one relay.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method for remote release of a seat latch mechanism, the method comprising the steps of:
   a. providing a remote release actuating system comprising a switch, a control mechanism, an actuator, a position sensor, and a return spring, said actuator in operative communication with the seat latch mechanism, said latch mechanism having a home position and a second position;
   b. engaging said switch;
   c. receiving a signal from said position sensor, wherein said position sensor determines whether the seat latch mechanism is in said home position or said second position;
   d. powering said actuator via said control mechanism;
   e. moving the seat latch mechanism from said home position to said second position; and
   f. allowing said return spring to return the seat latch mechanism to said home position.

2. The method according to claim 1, further comprising the step of checking whether the seat latch mechanism is in said home position.

3. The method according to claim 1, further comprising the step of sensing an amount of current delivered to said actuator.

4. The method according to claim 1, further comprising the step of moving a cable.

5. The method according to claim 1, further comprising the step of powering an enabling line.

6. The method according to claim 1, further comprising the step of powering said actuator with a predefined polarity.

7. The method according to claim 1, further comprising the step of monitoring a position of the seat latch mechanism.

8. The method according to claim 1, further comprising the step of toggling said switch in a first direction.

9. The method according to claim 1, further comprising the step of powering at least one relay.

10. A method for remote release of a seat latch mechanism, the method comprising the steps of:
    a. providing a remote release actuating system comprising a switch, a control mechanism, an actuator, a position sensor, and a return spring, said actuator in operative communication with the seat latch mechanism, said latch mechanism having a home position and a second position;
    b. engaging said switch;
    c. powering said control mechanism;
    d. receiving a signal from said position sensor, wherein said position sensor determines whether the seat latch mechanism is in said home position or in said second position;
    e. powering said actuator with a predefined polarity;
    f. moving the seat latch mechanism from said home position to said second position;
    g. powering said actuator with a polarity opposite said predefined polarity; and
    h. allowing said return spring to return the seat latch mechanism to said home position.

* * * * *